Dec. 28, 1965  W. N. KING ETAL  3,225,685
METHOD AND APPARATUS FOR WAFERING FIBROUS ORGANIC MATERIAL
Filed July 19, 1963  3 Sheets-Sheet 1
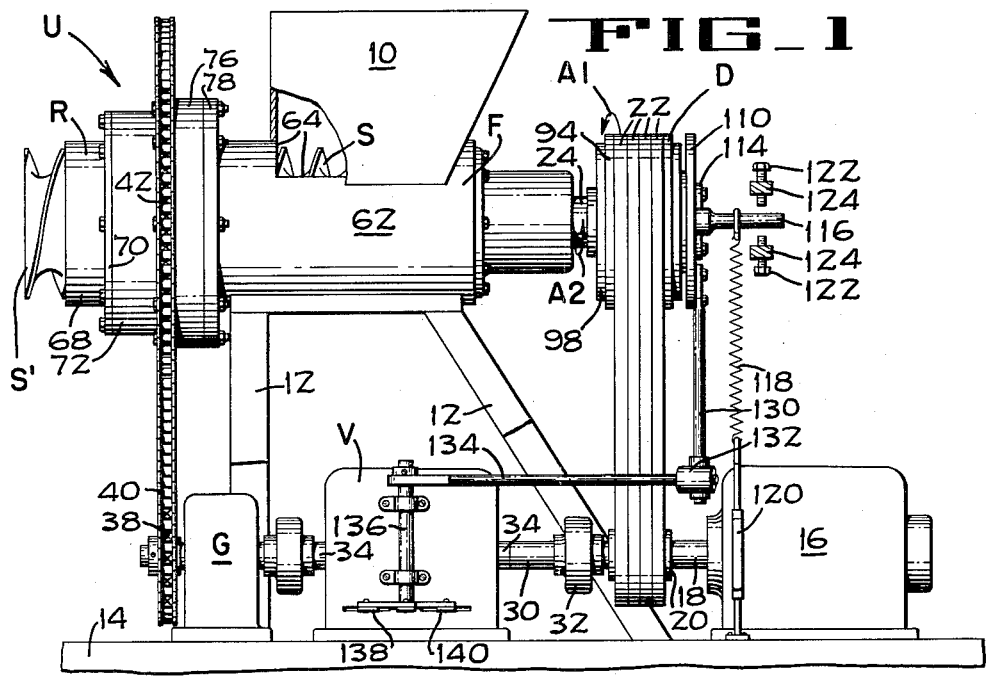
FIG_1
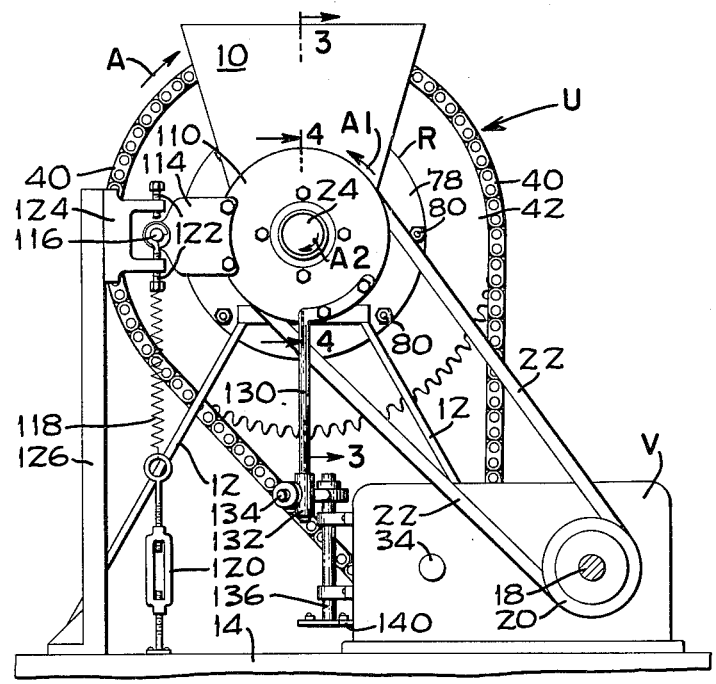
FIG_2
INVENTORS
WILLIAM N. KING
ARTHUR L. MC GEE
BY Hans G. Hoffmeister
ATTORNEY

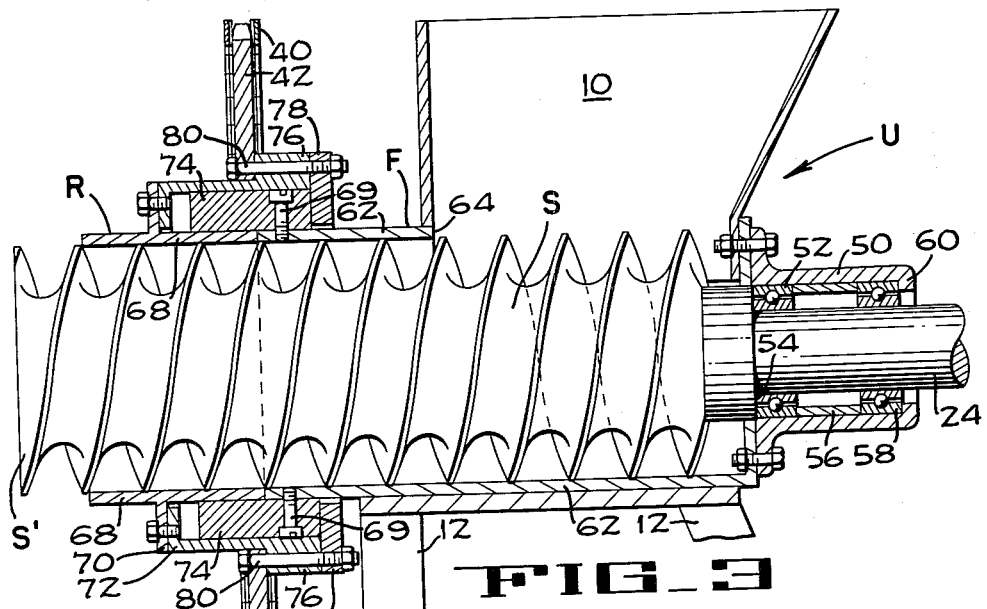
FIG_3
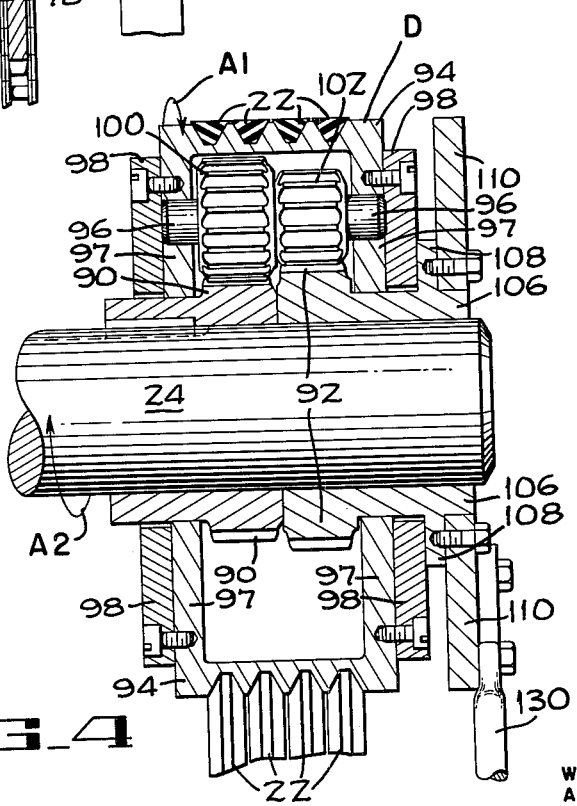
FIG_4
INVENTORS
WILLIAM N. KING
ARTHUR L. MCGEE
BY *Hans G. Hoffmeister*
ATTORNEY

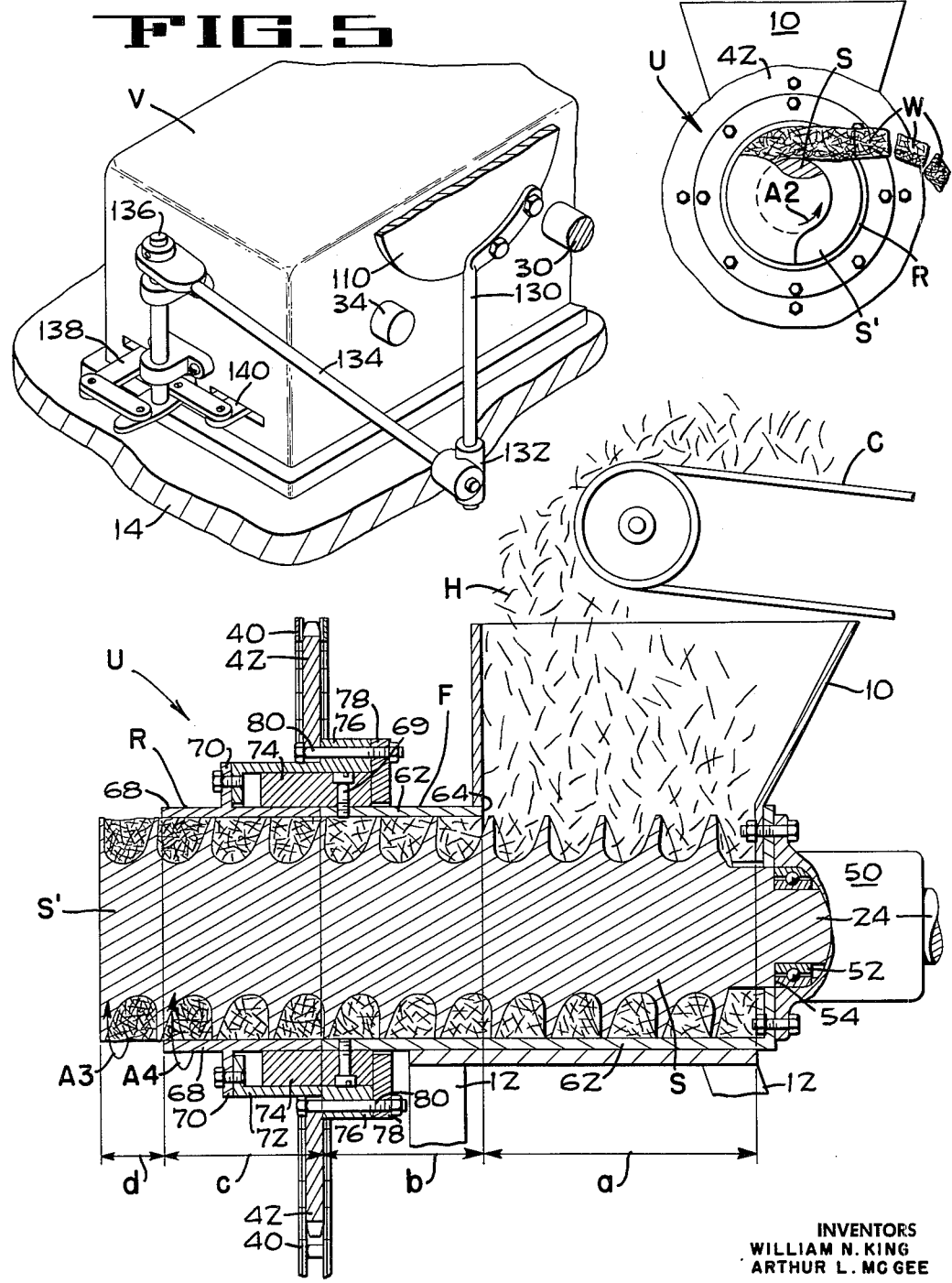

United States Patent Office 3,225,685
Patented Dec. 28, 1965

3,225,685
METHOD AND APPARATUS FOR WAFERING
FIBROUS ORGANIC MATERIAL
William N. King, Los Gatos, and Arthur L. McGee, San
Jose, Calif., assignors to FMC Corporation, San Jose,
Calif., a corporation of Delaware
Filed July 19, 1963, Ser. No. 296,226
11 Claims. (Cl. 100—41)

This invention relates to a method and apparatus for wafering or pelleting fibrous organic material while it is in a moist or slightly moist condition. In recent years the preparation of feed for cattle and other animals in the form of wafers or pellets has been proposed, and the word "wafering," as it will be employed in this specification, refers to the compressing and compacting of the material to form cakes, wafers or pellets, which will be referred to as wafers, while maintaining the nutrient juices of the material, so that the completed wafers are acceptable as fodder. A common starting material for forming such wafers is hay that is drier than freshly cut or green hay, but which still has an appreciable moisture content. The hay is chopped into relatively short lengths in preparation for the wafering operation, or it may be masticated in accordance with the process disclosed and claimed in the patent to King 3,013,880, December 19, 1961, assigned to the assignee of the present invention.

The method and apparatus of the present invention will be described in detail in conjunction with the wafering of hay, although the invention is not limited to the use of such starting material, in that other organic fibrous materials suitable for the use as fodder such as sugar cane, the leaves of plants such as pineapples or the like, may be formed into wafers in accordance with the present invention.

In the method and apparatus of the present invention, the wafering is performed by a screw or auger type extruder unit, and consideration is taken of the fact that chopped or masticated hay, having the proper moisture content for wafering, may be compacted relatively easily, that is without requiring excessive compacting or wafering pressure. However, it has been found that, once the hay is compacted or compressed into a body of material having the desired density and a given shape, it is difficult to cause the compacted material to flow through an orifice that either reduces or changes the cross-sectional shape or area of the compacted body of material. The movement of a body of compacted hay, for example, under conditions wherein its cross-sectional shape or area is changed, breaks up and recompacts the material, and this requires excessive pressure and power, to accommodate the final extrusion and release of the material from the apparatus. These difficulties are particularly troublesome when screw or auger type units are employed as an extrusion device.

It is an object of the present invention to compact material of the type described, into a continuous length of material having sufficient density to form wafers, pellets or cakes, that will have good mechanical strength, and to release the compacted material without changing its cross-sectional shape or area. The attainment of this object by the improved extrusion method and apparatus of the present invention also minimizes the amount of power required to form the hay into wafers of the desired density.

A corollary of the above object is to render unnecessary the use of final extrusion or compacting dies, while insuring that the compacted material, as delivered from the apparatus, will have the desired physical characteristics to withstand rough handling, while maintaining the nutrient juices required for high quality fodder.

Another object of the present invention is to provide an improved machine for wafering hay or the like.

Another object is to provide an improved process of wafering hay or the like.

Another object is to provide for a single continuous confining, gathering, propelling, compression and compacting of the material into its ultimate density characteristics, without breaking up and recompacting the material during the process. It has been found that the longer the period during which the hay is confined under pressure during the compacting and compressing operation, the more stable the wafers will be in response to a given wafering pressure. By providing a continuous single compacting and wafering operation in accordance with the present invention, the process eliminates breaking up and recompacting of the hay, affords maximum utilization of machine time, and minimum compacting pressures are required, all while obtaining wafers of optimum quality for use as fodder.

Another object of the invention is to provide ample throughput of material, such as hay, in a given size apparatus, or conversely, to make possible a reduction in the size of the apparatus as compared to prior devices for a given throughput of material.

Another object of the invention is to provide for a simple and precise control of the amount of compression or compaction of the material, and hence of the density of the completed wafers, pellets or cakes.

Briefly, the above objects and advantages are obtained by the apparatus and method of the present invention, which employs a screw or auger type combined compactor and extruder. In the apparatus of the present invention, the wafering apparatus includes a fixed casing section for the screw, having a material receiving and pickup chamber from which extends a cylindrical material compacting, and propelling or pumping chamber. A rotating casing section forms a prolongation of the fixed casing member, and provides a cylindrical control chamber. The screw or auger rotates within the chamber of both the fixed and the rotating casing sections.

The delivery end of the rotating casing section is entirely open, and the only obstruction to the release of the compacted hay is that provided by the portion of the auger that lies within the control chamber. With this apparatus, a helical body of material is formed by extrusion. The material is continuously picked up and separated from the input material, and compacted in the chamber of the fixed casing section, and the degree of compaction of the material in the compacting chamber is controlled by adjusting the speed of rotation of the rotatable casing section. The material emerges from a terminal portion of the screw that projects from the open end of the rotatable casing section. It emerges as a compacted, elongated, helical body of material, which automatically breaks into wafers of the desired size, under the action of centrifugal force, after the helical body of material clears the control chamber.

The rotatable casing section is turned in the same direction as, but slower than, the screw. This arrangement provides precise control of wafer density, as will be explained in detail in the specification that follows.

Other objects of the invention are to reduce the power requirements of the machine, to provide a light weight, compact apparatus suitable for field use, and to maintain the nutrient juices in the wafers during the wafering operation.

The manner in which these and other objects of the present invention may be obtained will be apparent from the following detailed description of a preferred embodiment thereof.

In the drawings:

FIG. 1 is a schematic side elevation of a hay wafering apparatus embodying the invention.

FIG. 2 is an end elevation with the motor removed.

FIG. 3 is an enlarged fragmentary vertical section taken on lines 3—3 of FIG. 2.

FIG. 4 is an enlarged vertical section through a differential type speed reducer for driving the screw, said section being taken along line 4—4 of FIG. 2.

FIG. 5 is a fragmentary perspective of a control mechanism for a variable speed drive used in the machine of FIG. 1.

FIG. 6 is a section similar to FIG. 3, but taken through the extruding screw and showing hay being exrtuded through the apparatus.

FIG. 7 is an end elevation of FIG. 6 with parts broken away.

As previously mentioned, the following detailed description of an embodiment of the invention will disclose an apparatus that is specifically suitable for the wafering of masticated hay, although those skilled in the art will recognize that the method and apparatus to be described are also applicable to the wafering of other organic fibrous materials. In the system to be described, in addition to including the improved screw-type extruder and compacting apparatus, the unit includes an automatic control for determining the speed of rotation of the rotatable casing section of the screw housing, as will be explained hereinafter.

Referring to FIGURES 1 and 2, the apparatus of the invention includes a compacting and extruding unit indicated generally at U. This unit includes a fixed casing section F, for compacting material received from a hopper 10 that is mounted on the section F. Forming a prolongation of the fixed casing section F, is a rotatable casing section R, for conrtolling the action of the screw and fixed casing section on the masticated hay. Within the fixed and rotatable casing sections just described, is a screw or auger S (FIG. 3), and the free end S' of the auger S projects from the rotatable casing section R. The fixed casing section F is mounted by means of legs 12 (FIG. 1) on a base 14, which may be part of a field machine which supplies hay to the hopper 10 from windows or the like. In the embodiment being described, the unit is not mounted on a field machine, but rather is shown as a stationary unit driven by an elecrtic drive motor 16, having a drive shaft 18. Of course, the electric motor could be replaced by an internal combustion engine or the unit could be driven directly from the field type machine, in a manner well known to those skilled in the agricultural arts.

The compacting screw or auger S is driven from a multiple V-belt pulley 20, mounted on the drive motor shaft 18. Pulley 20 drives V-belts 22, which in turn drive a differential type gear reducer D, mounted on the shaft 24 of the screw S. The construction and purpose of the differential gear reducer unit D will be explained in detail as this description proceeds.

The drive means or motor 16 also rotates the rotatable casing section R, but at a variable speed, and in a manner to be described later in this specification. In order to rotate casing section R, the drive shaft 18 has an extension 30 (FIG. 1) coupled to the motor shaft 18 by a coupling 32. The shaft extension 30 drives a variable speed drive unit V, and the output shaft 34 of the variable speed drive unit V drives a gear reducer G. The output shaft of the gear reducer G drives a sprocket 38, which by means of a chain 40, drives a large sprocket wheel 42, mounted on and secured to the rotatable casing section R. The speed of the output shaft 34, and hence of the rotatable casing section R, is automatically adjusted in accordance with the load developed within the extruding apparatus, in a manner to be explained in detail presently.

The construction of the casing and screw elements that extrude and compact the masticated hay is best seen in FIGURE 3, which is a vertical section through this portion of the apparatus. In order to mount the casing structure on the shaft 24 of the screw S, a hub 50 is bolted to the fixed casing section F. Within the hub is an inner bearing 52, mounted on the shaft 24, with the bearing abutting a shoulder 54 formed on the screw S. The bearing assembly also includes a spacing sleeve 56, and an outer bearing 58, which are retained in the hub 50 by a retainer flange 60, projecting inwardly from the hub.

The fixed casing section F includes a generally cylindrical body 62 for receiving the screw S. The body 62 is apertured as at 64, to admit starting material fed into the hopper 10, for pick up and advance by the screw S.

The rotatable casing section R, which serves as a control section, also includes a cylindrical body 68 that forms a continuation of the cylindrical body 62 of the fixed casing section F. In order to mount the control section 68, it is provided with a radial flange 70 to which is bolted a combined bearing and retainer sleeve 72. An inner bearing sleeve 74 is secured to the outer end of fixed casing section 62 by capscrews 69 and serves to locate the sleeve 72 radially and axially. The retainer sleeve 72 is provided with a radial flange 76, to which is bolted a retainer plate 78, that engages the end face of the fixed bearing sleeve 74. The retainer plate 78, as well as the sprocket wheel 42 that drives the rotatable casing section R, are both bolted to the flange 76 by means of bolts 80.

The purpose of the control system is to adjust the load or power absorbed by the screw S and thereby control the density of the wafers produced by the apparatus. If the rotatable casing section R is held fixed, that is, if it is not rotated, then the hay or other material passes through the casing and screw assembly with little or no compaction. Under these conditions, the screw S merely acts as a conveyor screw. At the other extreme, if the rotating casing section R is rotated in the same direction as, and at the same speed as the screw S, maximum compacting of the material and maximum density of the wafers would be provided. Ordinarily the rotating casing section R is rotated at an intermediate speed, namely, at a speed that is slower than the speed of the screw S, and in the same direction of rotation as that of the screw. The reason that rotation of the rotatable casing section R at the same speed as that of the screw, and in the same direction, would result in maximum pressure, compaction and density, is easily explained. Under these conditions the rotatable casing section R and the screw are turning together, and there is no relative rotation between them. Thus these parts do not act as a conveyor but merely as a nozzle, through which all of the material must be forced by the portion of the screw lying within the fixed casing section F. This preliminary description is given in order to provide a better initial understanding of the principles of operation of the control system.

The differential gear reducer D, previously referred to, not only drives the screw S, but senses the load within the extruding and compacting unit U. The design details of this unit do not form part of the present invention, such units being commonly available to the trade. A typical unit that is employed in the embodiment of the invention being described is shown in FIGURE 4 of the drawings, and will now be described briefly. This unit is supplied to the trade under the trade name of "Roto Mission" Differential Action Gear Reducer and is manufactured by the Airborne Accessories Corporation, of Hillside, New Jersey.

The construction of the planetary, differential action gear reducer unit D appears in the section of FIGURE 4. Keyed to the shaft 24 of the screw S, is a screw driving sun gear 90. Adjacent to the sun gear 90, and freely rotatable on the screw shaft 24, is a torque reaction sun gear 92. These sun gears are acted upon by rotation of the belt driven housing or gear case 94 of the unit, which is driven by the belts 22 and the drive motor pulley 20, as previously described.

Three planetary gear assemblies are mounted in the housing 94, but only one of such assemblies appear in FIGURE 4. The planetary assembly appearing in FIGURE 4 includes a planet pinion shaft 96, that is rotatably mounted in the side walls 97 of the housing 94. The planet pinion shaft 96 is retained in the housing side walls 97 by retainer plates 98, secured to each side wall of the housing.

A screw driving planet pinion 100 is splined to shaft 96, and this pinion meshes with the screw driving sun gear 90. A torque reaction planet pinion 102 is also splined to shaft 96, and this pinion meshes with the torque reaction sun gear 92. In order to sense the torque or load absorbed by the screw shaft 24, the torque reaction sun gear 92 has an extension sleeve or hub 106, which projects through the adjacent side wall 97 of the housing 94. Sleeve 106 is formed with a mounting flange 108, and secured to the mounting flange 108 is a torque plate 110, which forms part of the system for controlling the speed of rotation of the rotatable casing section R, of the extruding screw assembly.

Before continuing the explanation of the control system, a brief explanation of the operation of the differential action gear reduction unit D just described will be provided. First it is noted that the torque reaction sun gear 92 has more teeth than does the screw drive sun gear 90, and the number of teeth on the pinions 102 and 100 are correspondingly different, in order that the unit will not lock up. The gear reduction provided by the assembly depends upon the relative number of teeth of the planetary gears 100 and 102, and in the system of the present invention a gear reduction of 4 or 5 to 1 is provided.

Since the torque plate 110 is prevented from turning by means to be explained presently, and since the housing 94 is rotated in a counterclockwise direction, as indicated by arrow A1 in FIGURE 2, then the screw shaft 24 will rotate in a clockwise direction as indicated by the arrow A2 on the shaft 24 in FIGURE 2. These directions of rotation are also indicated in FIGURES 1 and 4, and provide the proper clockwise direction of rotation of the screw S, for extruding the material through the unit.

Actually, the torque plate 110 is not firmly fixed, but it is spring loaded and the reaction of the load on the screw shaft 24 is such as to urge the torque plate 110 in a clockwise direction. (FIG. 2).

In addition to driving the extruder screw S, the differential gear reducer D operates a control mechanism for controlling the speed of the rotatable casing section R of the extruder. The speed of the rotatable casing section R is determined by the position of the torque plate 110, and this in turn is controlled by a control spring assembly, seen in FIGURES 1 and 2. The control spring assembly includes a torque spring plate 114 secured to torque plate 110, as best seen in FIGURE 2. A spring post 116 (FIG. 1) projects from the torque spring plate 114.

The control spring 118 of the system is a tension spring that is hooked to the spring post 116, and to a turnbuckle 120, the other end of the turnbuckle being secured to the base 14. The tension of the spring 118 is adjusted by manipulation of the turnbuckle 120, in the conventional manner. Although more complicated spring adjusting devices, including indicators and the like, may be provided to perform this adjustment function, the turnbuckle 120 is illustrated as a simple and inexpensive means for accomplishing the desired setting of the tension of the control spring 118. In order to prevent excessive rotation of the torque plate 110, opposed stop screws 122 are mounted in a stop bracket 124, which bracket is supported from the base 14 by means of a leg 126. Thus, as indicated by the arrows on FIGURE 2, with an extruder screw S of the hand illustrated, and with the extruder casing section R being rotated in the direction shown by arrow A in FIGURE 2, the torque reaction on the plate 110 will be such as to tend to stretch the control spring 118.

As previously mentioned the spring controlled motion of the torque plate 110, is converted into control of the speed of rotation of the rotatable casing section R. This control is effected by a control arm 130 secured to the torque plate 110. The lower end of arm 130 is slidable in a universal joint 132. A variable speed drive control arm 134 has its outer end slidable in the universal joint 132, and the other end of arm 134 is connected to the control mechanism of the variable speed drive unit V. As best seen in FIGURE 5, arm 134 is keyed to and rotates a vertical shaft 136, which rotation moves speed change levers 138 and 140 in opposite directions, to vary the speed settings of the variable speed drive unit V. As mentioned previously, the details of the mechanism for varying the speed of drive unit V are not a part of the present invention, and the unit V illustrated is merely one of many conventional type variable speed drive units available to the trade. The control system illustrated is typical of the Reeves variable speed drive unit. These units are manufactured by the Reliance Electric and Engineering Company of Cleveland, Ohio, and represent one of many types of variable speed drive units suitable for installation in the system of the present invention.

The action of the extruder mechanism upon masticated hay is illustrated diagrammatically in FIGURES 6 and 7. Masticated hay H is supplied to the hopper 10 of the unit H by a conveyor C, illustrated diagrammatically in FIGURE 6, or by any other means, the details of which form no part of the present invention. Masticated hay enters the inlet opening 64 in the fixed body portion 62 of the fixed casing section F. The portion of the screw coextensive with the opening 64 merely serves as a conveyor to pick up and gather masticated hay. This portion of the screw housing is indicated as chamber $a$, in the diagram of FIGURE 6.

The screw transports the hay from the pick up chamber $a$ into a compacting chamber $b$ also indicated in FIGURE 6. The compacting chamber $b$ is defined by that portion of the cylindrical body 62 that extends from the end of opening 64 to the end of the fixed body section 62. Within the compacting chamber $b$, the masticated hay is compressed and compacted, so that near the delivery end of the compacting chamber it is in the form of a helical body of compacted hay, containing most of the nutrient juices of the hay.

The cylindrical body portion 68 of the rotating casing section R forms a control chamber $c$, also indicated in FIGURE 6. This section is rotating in the same direction as the screw S, as indicated by the arrow A3 and A4 in that figure. As noted above, this rotation of the control chamber section 68 is usually slower than that of the screw S, and the effect of such rotation varies from minimum compaction when the control chamber section 68 is fixed, to maximum compaction when the control section 68 rotates at the same speed as the screw S. As previously mentioned, the control effect of the rotatable casing section R is easily explained. When the control section 68 of casing section R is held from rotation, the screw merely acts as a conveyor and propels the hay through the fixed and control sections of the extruder without substantial compaction. However, if the control section 68 rotates at the same speed as the screw S, then the entire control section $c$ of the rotating section 68 acts as a nozzle, and therefore resists extrusion of the material compacted in the compacting chamber $b$ through the control chamber $c$.

Thus it can be further seen that at intermediate speeds of the control section of the casing, an intermediate action is obtained, so that control of the degree of compacting of the hay is obtained by control of the speed of rotation of control section 68.

The flights of the screw S are formed so that they do not materially change the cross-sectional shape or area of the helical body of compacted hay. Furthermore, casing sections 62 and 68 are cylindrical, and form continuations of one another, so that they do not provide any obstruction to the delivery of the hay out of the rotating casing section. Thus, as indicated in FIGURE 7, the compacted helical body of hay emerges from the protruding end of the screw S in a zone indicated as the release zone d, in FIGURE 6, without having undergone any change in cross-sectional shape or area. As indicated in FIGURE 7, this emerging ribbon of compacted hay breaks into wafers W, as the helical ribbon of compacted hay frees itself from the screw S. The action of centrifugal force assists in breaking the ribbon of compacted hay into wafers of substantially uniform size.

Thus it can be seen that the combination of the rotatable, open ended casing section 68, a uniform diameter screw and a fixed housing section 62, provide the effect of a compacting nozzle without requiring reduction in cross-sectional area of the helical ribbon of compacted material.

This has the desirable advantages previously referred to as making it unnecessary to compact and then break up and recompact the material in the process of releasing it from the extruding unit. This in turn reduces the force required to operate the unit, and minimizes the horsepower required to drive a unit of a given size.

The data below are provided as an example of a typical apparatus for wafering masticated hay. These data are not limiting, but are provided merely as a further detailed description of the invention.

Screw:
  Diameter—6 inches.
  Length—18 inches.
  Flights—Double, 15° pitch angle, screw flights 1½ inches wide and 1⅜ inches deep.
  Speed of rotation—100 r.p.m.
  H.P. required—App. 25 (depends on hay characteristics and wafer density).

Extruder housing:
  Length of compacting chamber (b)—4 inches.
  Length of control chamber (c)—4 inches.
  R.p.m. of control chamber (c)—Variable, 15 to 100 r.p.m.

If it is desired to increase the friction between the hay and the compacting and control chamber walls, the walls of these chambers may be axially ribbed or rifled, but the mode of operation remains the same. The grooves, in the example given, will be about 1/16" deep and ¼" wide.

Having completed a detailed description of the invention so that those skilled in the art may practice the same we claim:

1. Apparatus for wafering fibrous organic material comprising a fixed casing member having a material receiving and pick up chamber and a generally cylindrical material compacting chamber extending axially from said receiving chamber to the delivery end of said fixed casing member, a rotatable casing member extending axially from the delivery end of said fixed casing member, said rotatable casing member having a generally cylindrical compaction control chamber forming a prolongation of said material compacting chamber and having an open delivery end, a coarse screw rotatably mounted in said chambers for picking up material in said receiving chamber, simultaneously gathering and compacting the material in said compacting chamber, extruding the compacted material through said control chamber, and delivering the compacted material out of the open end of said control chamber, means for rotating said screw in one direction, and means for rotating said rotatable casing member in the same direction but at a lower angular velocity, said screw forming the sole obstruction to the delivery of compacted material out of the open delivery end of said compacting control chamber.

2. Apparatus for wafering fibrous organic material comprising a fixed casing member having a material receiving and pick up chamber and a generally cylindrical material compacting chamber extending axially from said receiving chamber to the delivey end of said fixed casing member, a rotatable casing member extending axially from the delivery end of said fixed casing member, said rotatable casing member having a generally cylindrical compaction control chamber forming a prolongation of said material compacting chamber and having an open delivery end, a coarse screw rotatably mounted in said chambers for picking up material in said receiving chamber, simultaneously gathering and compacting the material in said compacting chamber, extruding the compacted material through said control chamber, and delivering the compacted material out of the open end of said control chamber, means for rotating said screw in one direction, and means for rotating said rotatable casing member in the same direction but at a lower angular velocity, said screw forming the sole obstruction to the delivery of compacted material out of the open delivery end of said compacting control chamber, said screw having a uniform diameter along its length within said compacting and control chambers, the helical groove means of said screw being of substantially uniform cross sectional area.

3. Apparatus for wafering fibrous organic material comprising a fixed casing member having a material receiving and pick up chamber and a generally cylindrical material compacting chamber extending axially from said receiving chamber to the delivery end of said fixed casing member, a rotatable casing member extending axially from the delivery end of said fixed casing member, said rotatable casing member having a generally cylindrical compaction control chamber forming a prolongation of said material compacting chamber and having an open delivery end, a coarse screw rotatably mounted in said chambers for picking up material in said receiving chamber simultaneously gathering and compacting the material in said compacting chamber, extruding the compacted material through said control chamber, and delivering the compacted material out of the open end of said control chamber, drive means for rotating said screw in one direction and drive means for rotating said rotatable casing member in the same direction but at a lower angular velocity, said screw forming the sole obstruction to the delivery of compacted material out of the open delivery end of said compacting control chamber, and control means for decreasing the speed of rotation of said rotating casing member relative to that of said screw in responce to an increase in the torque required to drive the screw.

4. Apparatus for wafering fibrous organic material comprising a fixed casing member having a material receiving and pick up chamber and a generally cylindrical material compacting chamber extending axially from said receiving chamber to the delivery end of said fixed casing member, a rotatable casing member extending axially from the delivery end of said fixed casing member said rotatable casing member having a generally cylindrical compaction control chamber forming a prolongation of said material compacting chamber and having an open delivery end, a coarse screw rotatably mounted in said chambers for picking up material in said receiving chamber, simultaneously gathering and compacting the material in said compacting chamber, extruding the compacted material through said control chamber, and delivering the compacted material out of the open end of said control chamber, means for rotating said screw in one direction, and means for rotating said rotatable casing member in the same direction but at a lower angular velocity, said screw forming the sole obstruction to the delivery of compacted material out of the open delivery end of said compacting control chamber, said screw having a uniform diameter along its length within said compacting and control chambers, the helical groove means of said screw being of substantially uniform cross sectional area, said screw having a compacted material release portion projecting out of said control chamber.

5. The apparatus of claim 3 wherein said control means comprises differential action gear reduction means connected between said screw drive means and said screw, said differential action gear reduction means also including a spring restrained torque member, and the drive means for said rotatable casing member comprising a variable speed drive unit driven by said screw drive means, with the output speed of said variable speed drive unit controlled by the position of said torque member.

6. Material extruding and compacting apparatus comprising a rotatable screw, a fixed casing surrounding an intermediate portion of said screw, a rotatable casing forming a prolongation of said fixed casing and surrounding the delivery portion of said screw, means for rotating said screw in one direction, means for rotating said rotatable casing in the same direction but at a slower speed, and means for decreasing the rotational speed of said rotatable casing relative to that of said screw in response to an increase in the torque required to drive said screw.

7. Material extruding and compacting apparatus comprising a rotatable screw, a fixed casing surrounding an intermediate portion of said screw, a rotatable casing forming a prolongation of said fixed casing and surrounding the delivery portion of said screw, a differential action gear reduction unit connected to said screw, drive means for rotating said unit for turning the screw in one direction, a variable speed drive for rotating said rotatable casing in the same direction but at a slower speed than that of the screw, and control means for decreasing the rotational speed of said rotatable casing relative to that of said screw in response to an increase in the torque required to drive said screw, said control means comprising a torque reaction member forming part of said differential action gear reduction unit, and a speed adjustment connection between said torque reaction member and said variable speed drive.

8. Material extruding and compacting apparatus comprising a rotatable screw of uniform diameter and flight depth, a fixed cylindrical casing surrounding an intermediate portion of said screw, a rotatable cylindrical casing forming a prolongation of said fixed casing and surrounding the delivery portion of said screw, means for rotating said screw in one direction, and means for rotating said rotatable casing in the same direction but at a slower speed, and means for adjusting the rotational speed of said rotatable casing relative to that of said screw.

9. Material extruding and compacting apparatus comprising a rotatable screw of uniform diameter and flight depth, a fixed cylindrical casing surrounding an intermediate portion of said screw, a rotatable cylindrical casing forming a prolongation of said fixed casing and surrounding the delivery portion of said screw, means for rotating said screw in one direction, means for rotating said rotatable casing in the same direction but at a slower speed, and means for decreasing the rotational speed of said rotatable casing relative to that of said screw in response to an increase in the torque required to drive said screw.

10. The method of wafering slightly moist, masticated, fibrous organic material comprising the steps of continuously picking up the material from a supply thereof, confining and compacting the material thus picked up into a continuous helical body of material while simultaneously propelling the continuous helical body of material, further confining the helical body of material along its length after it has been compacted, and simultaneously resisting the propelling of the helical body of material while maintaining its cross sectional area substantially constant, progressively releasing the confined helical body of compacted material without mechanically changing its cross sectional shape upon release thereof, and adjusting the degree of resistance to the propelling of the helical body of compacted material in proportion to the work required to compact the material.

11. The method of wafering slightly moist, masticated fibrous organic material between an inlet zone and a discharge zone, comprising the steps of continuously picking up the material from a supply thereof and urging the material to move between said zones as a continuous, unitary helical body, confining and partially compacting the material thus picked up while simultaneously propelling the continuous helical body of material along its axis over a first compacting stage, transferring the material partially compacted in the first stage directly to a second compacting stage, abruptly increasing the frictional resistance to axial propulsion of the helical body of material as it enters the second stage, for additionally compacting the partially compacted material to the desired density, while maintaining the diameter of the helical body of the material in the second stage substantially constant, and progressively releasing the confined helical body of additionally compacted material without mechanically changing the cross sectional shape of the material upon release thereof.

References Cited by the Examiner

UNITED STATES PATENTS

| 2,280,620 | 4/1942 | Anderson | 100—43 |
| 2,857,624 | 10/1958 | Hanzel et al. | |
| 3,044,391 | 7/1962 | Pellett | 100—148 |
| 3,084,620 | 4/1963 | Gibbons. | |
| 3,102,694 | 9/1963 | Frenkel | 259—3 X |
| 3,102,716 | 9/1963 | Frenkel | 259—3 |

References Cited by the Applicant

FOREIGN PATENTS 145,409   5/1962   Russia.

WALTER A. SCHEEL, *Primary Examiner.*

LOUIS O. MAASSEL, *Examiner.*